US011167609B2

(12) United States Patent
Wallgren et al.

(10) Patent No.: US 11,167,609 B2
(45) Date of Patent: Nov. 9, 2021

(54) VEHICLE AXLE HAVING A CENTRALLY ARRANGED DRIVE UNIT

(71) Applicant: ZF Friedrichshafen AG, Friedrichshafen (DE)

(72) Inventors: Klaus Wallgren, Karlsfeld (DE); Knut Heidsieck, Bünde (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/640,099

(22) PCT Filed: Jul. 16, 2018

(86) PCT No.: PCT/EP2018/069185
§ 371 (c)(1),
(2) Date: Feb. 19, 2020

(87) PCT Pub. No.: WO2019/037946
PCT Pub. Date: Feb. 28, 2019

(65) Prior Publication Data
US 2020/0290417 A1  Sep. 17, 2020

(30) Foreign Application Priority Data
Aug. 22, 2017  (DE) .................. 10 2017 214 640.0

(51) Int. Cl.
*B60G 7/00* (2006.01)
*B60G 13/00* (2006.01)
(Continued)

(52) U.S. Cl.
CPC ............... *B60G 3/20* (2013.01); *B60G 7/006* (2013.01); *B60G 7/008* (2013.01); *B60G 13/006* (2013.01);
(Continued)

(58) Field of Classification Search
CPC ............ B60G 2300/50; B60G 2206/12; B60G 2200/184; B60G 2200/18;
(Continued)

(56) References Cited

U.S. PATENT DOCUMENTS 2,229,354 A * 1/1941 Utz .................. B60G 7/008
267/254
8,286,979 B2 10/2012 Schote
(Continued)

FOREIGN PATENT DOCUMENTS

DE  10 2010 012 014 A1  9/2011
DE  10 2012 011 867 A1  1/2013
(Continued)

OTHER PUBLICATIONS

Machine translation of DE 102012011867 A1 provided by Espacenet.com, Apr. 6, 2021.*
(Continued)

*Primary Examiner* — Ruth Ilan
*Assistant Examiner* — Maxwell L Meshaka
(74) *Attorney, Agent, or Firm* — Finch & Maloney, PLLC; Michael J. Bujold; Jay S. Franklin

(57) ABSTRACT

A vehicle axle with a centrally arranged drive unit and a wheel suspension which has a wheel carrier for holding a wheel, a lower wheel-guiding control arm for the articulated connection of the carrier to a vehicle body, a camber link that connects the carrier to the body and steering unit for steering
(Continued)

the wheel. The carrier and control arm are connected directly, in a first connection area, and indirectly via an integral link, in a second connection area, so that the carrier can pivot relative to the control arm about a steering axis. The control arm can be connected to the body in forward and rear areas, and has a rotational axis that extends obliquely relative to the longitudinal direction of the vehicle. All connection areas of the control arm are positioned outside the centrally arranged drive unit relative to the transverse direction of the vehicle.

16 Claims, 4 Drawing Sheets

(51) Int. Cl.
*B60K 7/00* (2006.01)
*B60G 3/20* (2006.01)

(52) U.S. Cl.
CPC .. *B60G 2200/184* (2013.01); *B60G 2200/422* (2013.01); *B60G 2200/44* (2013.01); *B60G 2202/152* (2013.01); *B60G 2204/129* (2013.01); *B60G 2204/4222* (2013.01); *B60G 2206/011* (2013.01); *B60G 2206/121* (2013.01); *B60G 2206/50* (2013.01); *B60G 2300/50* (2013.01); *B60K 7/0007* (2013.01)

(58) Field of Classification Search
CPC ...... B60G 2204/422; B60G 2204/4222; B60G 2206/121; B60G 2200/462; B60G 2200/46; B60G 2200/44; B60G 2200/42; B60G 2206/50; B60G 2200/422; B60G 7/008; B60G 3/20; B60K 7/0007
See application file for complete search history.

(56) References Cited

U.S. PATENT DOCUMENTS

| 9,022,401 | B1* | 5/2015 | Rawlinson | B60G 11/28 280/124.125 |
| 9,022,402 | B1* | 5/2015 | Rawlinson | B60G 11/28 280/124.125 |
| 2007/0080509 | A1* | 4/2007 | Kim | B60G 7/006 280/5.52 |
| 2013/0257006 | A1* | 10/2013 | Kunert | B60G 7/001 280/124.136 |
| 2014/0096641 | A1* | 4/2014 | Hoshinoya | B60L 15/2054 74/665 L |
| 2019/0061504 | A1* | 2/2019 | Bassis | B60K 17/356 |
| 2019/0126702 | A1 | 5/2019 | Hacker et al. | |

FOREIGN PATENT DOCUMENTS

| DE | 10 2015 206 340 A1 | 10/2016 |
| DE | 20 2017 100 164 U1 | 4/2017 |
| DE | 10 2016 200 096 A1 | 7/2017 |
| WO | 2007/045308 A1 | 4/2007 |

OTHER PUBLICATIONS

Machine translation of WO 2007045308 A1 provided by Espacenet. com, Apr. 6, 2021.*
International Search Report Corresponding to PCT/EP2018/069185 dated Jan. 24, 2019.
International Search Report Corresponding to PCT/EP2018/069186 dated Oct. 24, 2018.
Written Opinion Corresponding to PCT/EP2018/069185 dated Jan. 24, 2019.
Written Opinion Corresponding to PCT/EP2018/069186 dated Oct. 24, 2018.

* cited by examiner

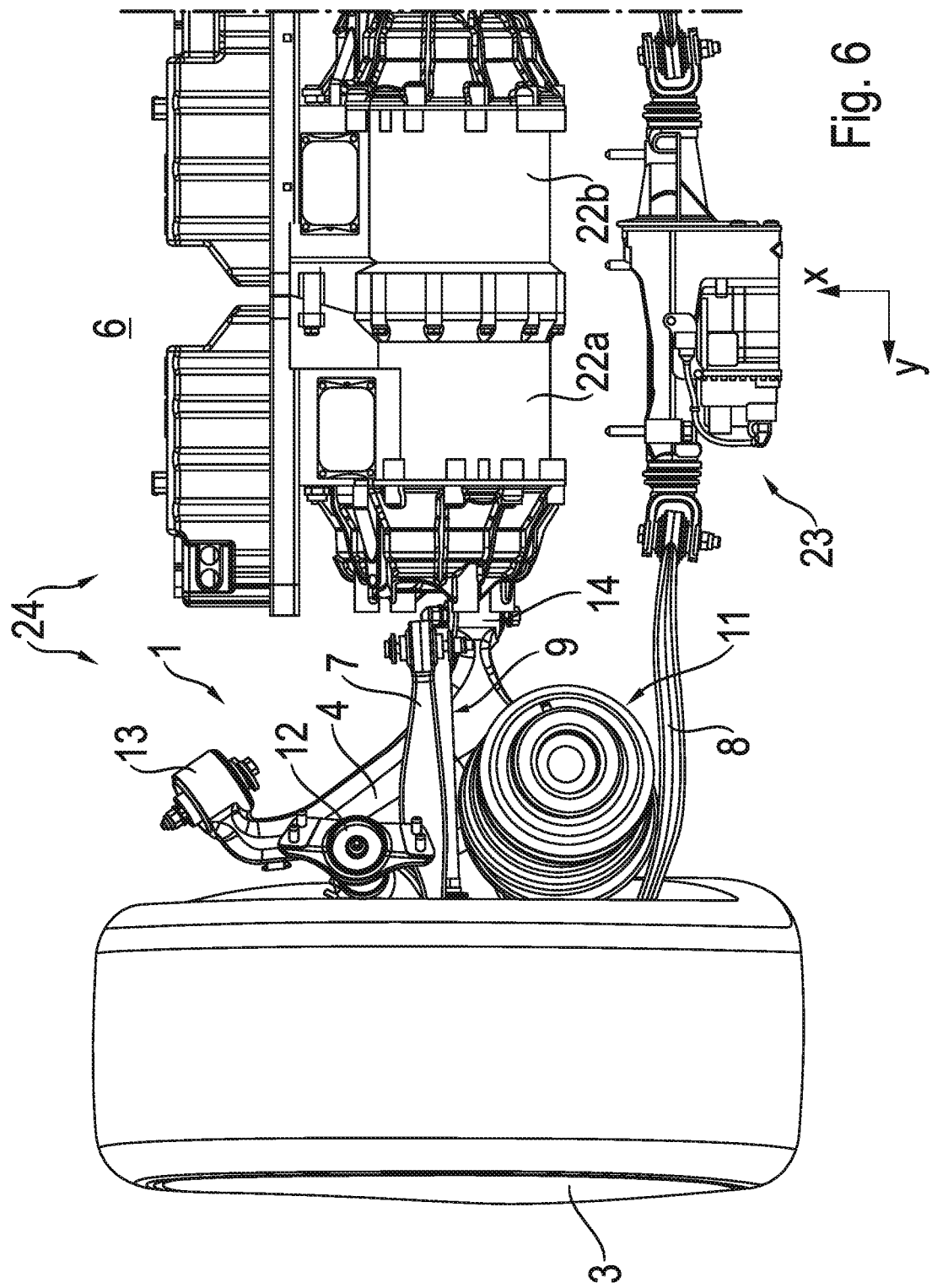

VEHICLE AXLE HAVING A CENTRALLY ARRANGED DRIVE UNIT

This application is a National Stage completion of PCT/EP2018/069185 filed Jul. 16, 2018, which claims priority from German patent application serial no. 10 2017 214 640.0 filed Aug. 22, 2017.

FIELD OF THE INVENTION

The present invention relates to a vehicle axle with a centrally arranged drive unit.

BACKGROUND OF THE INVENTION

From DE 10 2016 200 096 A1 a drivable and steerable rear axle of a vehicle is known. For that purpose a wheel carrier, which holds a wheel that can be driven by way of a driveshaft, is articulated to a wheel-guiding control arm. The wheel-guiding control arm, which consists of a component that extends essentially in the longitudinal direction of the vehicle and, connected thereto, a component that extends essentially in the transverse direction of the vehicle, is articulated by means of two mountings on the body side to a body of the vehicle and can therefore undergo vertical movements in the area of the wheel carrier.

In the context of this application the term "body" is to be interpreted broadly, and in particular covers both the body of the vehicle and assemblies connected permanently to it, such as an axle carrier fixed to the vehicle body or connecting components which are comparable thereto.

In DE 10 2016 200 096 A1 the wheel-guiding control arm and the wheel carrier are articulated to one another via a ball joint in such manner that the wheel carrier can pivot about a steering axis relative to the wheel-guiding control arm. The steering axis extends through the same ball joint and a further articulation point at an upper end of the wheel carrier, where the wheel carrier is articulated to a camber link which, at its end facing away from the wheel carrier, is in turn articulated to the body of the vehicle. The steering axis of the wheel carrier so formed, which passes through the lower and upper connection points of the wheel carrier, can change its position relative to the body of the vehicle depending on the jouncing condition, and is therefore a steering axis with a dynamic position relative to the vehicle body. To enable steering movements of the wheel carrier about the steering axis so formed, a track rod extending in the transverse direction of the vehicle engages at a rear end of the wheel carrier. By moving the track rod in the transverse direction of the vehicle the wheel carrier undergoes a steering movement, i.e. it pivots about the aforesaid steering axis.

To support the wheel carrier, in particular the driving or deceleration forces or torques acting upon it, the wheel carrier in its rear area is coupled to the wheel-guiding control arm by means of an integral link. For that purpose a lower end of the integral link is articulated to the wheel-guiding control arm, while an upper end of the integral link is articulated to a rear end of the wheel carrier. When a steering movement is carried out, the upper end of the integral link is pivoted in the transverse direction of the vehicle.

DE 10 2010 012 014 A1 describes a steerable rear axle of a motor vehicle which embodies individual features of the independent claim(s). The vehicle axle comprises a spring-damper system in the form of an assembled structural unit, which is supported on one side on the wheel-guiding control arm and on the other side on the body of the vehicle, in order in that way to damp operationally induced vibrations of the wheel-guiding control arm.

For a modular vehicle axle that can be used in different vehicle variants, however, a dissociated structure with a separated spring and damper is preferable. This is because especially in passenger motor vehicles the full loading width and/or the height of the loading space in the vehicle concerned can be increased thereby, and furthermore, by virtue of a particular choice of spring type a spring behavior which is matched to the vehicle and if necessary even adjustable can be produced more simply (and inexpensively), since owing to the separation of the components there are fewer component variants.

For various reasons it may be desirable to drive a vehicle axle by means of a drive unit which is associated with the vehicle axle, is centrally positioned and in particular electrically powered. If the drive unit is to supply sufficient drive power, however, a correspondingly large fitting space is required. In particular the transverse extension of the axle drive unit, i.e. its size in the transverse direction ("y") of the vehicle, will as a rule have an adverse effect upon the dynamic properties of the vehicle axle since if the latter is designed in accordance with DE 10 2010 012 014 A1 it would be necessary to shorten the lower wheel-guiding control arm.

SUMMARY OF THE INVENTION

The purpose of the present invention is to indicate a vehicle axle of the type which permits the wheel it holds to be driven and steered, and in addition, which utilizes any remaining structural space as efficiently as possible for other components, in particular the spring-damper system of the wheel suspension. Furthermore, as regards the type and arrangement of the spring-damper system, greater variability should be provided.

The objective is achieved by a vehicle axle having the characteristics specified in the independent claim(s). According to the invention, this is a vehicle axle with a centrally arranged and in particular electrically powered drive unit and a wheel suspension, wherein the wheel suspension comprises a wheel carrier for holding a wheel, a lower wheel-guiding control arm for the articulated connection of the wheel carrier to a body, a camber link that connects the wheel carrier to the body and steering means for steering the wheel, wherein the wheel carrier and the wheel-guiding control arm are connected in a first connection area directly and in a second connection area indirectly by way of an integral link, so that relative to the wheel-guiding control arm the wheel carrier can pivot about a steering axis. Thus, this is a rear axle which can optionally be steered actively. The wheel-guiding control arm can be connected, in particular articulated to the body in a forward area and in a rear area, and has a rotational axis which is oblique relative to the longitudinal axis of the vehicle, and all the connection areas of the wheel-guiding control arm are positioned outside the centrally arranged drive unit in relation to the transverse direction of the vehicle.

This is therefore a vehicle axle in which, according to the invention, as regards its pivot axis, the lower wheel-guiding control arm is positioned obliquely relative to the longitudinal direction of the vehicle. The expressions "in a forward area" and "in a rear area" in the context of the wording of the independent claims is understood to relate to the longitudinal direction of the vehicle. So in relation to the longitudinal direction of the vehicle, the forward area is farther forward than the rear area. In this case the oblique position relative to the longitudinal direction of the vehicle advantageously contributes toward improving the use of the structural space, first since for further vehicle elements, in particular the spring-damper system, favorable gear ratios are provided. This is because the oblique position ensures that the ratio between the spring and/or damper travel path on the one hand, and the wheel stroke on the other hand, can be made large despite the comparatively small structural space in the transverse direction of the vehicle (due to the centrally arranged drive unit).

According to an advantageous further development of the invention, the drive unit comprises at least one electric drive motor such that between the drive unit and the wheel a driving connection can be formed in order to drive the wheel.

A configuration advantageous from the design standpoint provides that on the wheel suspension of the vehicle axle a chassis element articulated on the body side is provided, which is connected directly to the wheel carrier. Quite generally, this can be any functional element that is related to the wheel suspension, in particular one that contributes to the damping and/or sprung suspension of the wheel relative to the body of the vehicle. Since the chassis element is connected directly to the wheel carrier, the vehicle axle described has advantages in relation to the use of structural space and the kinematic behavior. Thanks to the direct connection between the chassis element and the wheel carrier, an end of the chassis element on the wheel carrier side can be supported at a point located far outside the middle of the vehicle, namely particularly close to the wheel. With an appropriate design of the wheel-guiding control arm this support point can contribute toward enabling the chassis element connected directly to the wheel carrier and articulated to the body, which is particularly preferably a damper, to be operated especially effectively (directly), since by virtue of the kinematics involved jouncing of the wheel results in comparatively firm engagement of the chassis element, particularly the damper ("sensitive response behavior").

As already mentioned earlier, the chassis element articulated to the body and connected directly to the wheel carrier is preferably a damper.

In an advantageous further development of the invention, the chassis element, particularly in the form of a damper, is arranged ahead of the middle of the wheel or above a driveshaft that drives the wheel. This arrangement has the advantage that the structural space behind the middle of the wheel is available for further components of the chassis.

From the kinematic standpoint it is expedient for the connection of the chassis element on the wheel carrier side, relative to the wheel carrier, to be close to the first connection area in which the wheel carrier and the wheel-guiding control arm are connected directly to one another.

Expediently, the two connection areas (the first and second connection areas) are a distance away from one another, particularly in the longitudinal direction of the vehicle. Various arrangements and designs of the connection areas are conceivable. According to a preferred further development of the wheel suspension one of the two connection areas, in particular the first connection area, is close to the middle of the wheel and the other connection area, the second one, is behind the middle of the wheel. It should be commented that accordingly, relative to the longitudinal direction of the vehicle, the first connection area can be arranged ahead of or alternatively slightly behind the middle of the wheel.

According to the invention, the wheel-guiding control arm has a rotational axis that extends obliquely relative to the longitudinal axis of the vehicle. For this, it is advantageous to connect the wheel-guiding control arm to the body (of the vehicle) in two areas, in particular a forward, outer area and a rear, inner area. The terms "forward" and "rear", and "outer" and "inner" here are understood to relate to the longitudinal direction of the vehicle and to the middle of the vehicle, respectively. Relative to the longitudinal direction of the vehicle and the middle of the vehicle, the forward, outer area is accordingly farther forward and farther outside than the rear, inner area. The oblique rotational axis of the wheel-guiding control arm brings advantages related to the design of the structural space, among others.

Advantageously, the vehicle axle has a spring-damper system of separated design, i.e. the spring and the damper are structurally separate chassis elements. The chassis element articulated to the body, which can be connected directly to the wheel carrier, is preferably the damper.

A preferred further development provides that—in parallel—the wheel-guiding control arm is supported relative to the body by means of a spring that extends essentially in the vertical direction of the vehicle. Accordingly, the spring and the damper are supported, as elements separated from one another, respectively on one side against the body, so that by virtue of its direct connection to the wheel carrier the damper damps movements of the latter directly, while the sprung suspension takes place relative to the wheel-guiding control arm.

A favorable use of structural space is obtained for the vehicle axle if, advantageously, relative to a longitudinal direction of the vehicle, the spring is arranged behind the middle of the wheel and/or behind a driveshaft that is driving the wheel. Speaking generally, relative to the middle of the wheel and/or a driveshaft driving the wheel, the spring can advantageously be arranged opposite the damper. When the spring is arranged behind the middle of the wheel or behind the associated driveshaft, the particular advantage is obtained that for the spring—close to the wheel—a particularly large structural space (in the longitudinal and transverse directions of the vehicle) is made available. This particularly large structural space enables the use of a larger spring diameter and also permits the use of a particular type of spring, specifically an adjustable spring such as in particular a pneumatically or hydraulically adjustable spring. Thanks to the adjustability of the spring, advantageous effects for the motor vehicle can be obtained, for example the height level of the motor vehicle can be actively influenced and/or the spring characteristic (hardness of the spring) can be influenced, whereby a desired driving comfort and also the driving stability can be actively varied. From the technical standpoint a pneumatically or hydraulically adjustable spring can advantageously be used. The structural space provided by the separated configuration makes it possible in particular to use a pneumatically adjustable spring, a so-termed air spring.

According to an advantageous design feature of the vehicle axle, the axle has a spring ratio of between 0.5 and 1, preferably about 0.7. The spring ratio is understood to mean the ratio between the distance of the spring from the rotational axis (of the wheel-guiding control arm) and the distance of the wheel from the rotational axis. Decisive for the size of the ratio (spring ratio) is the oblique position of the rotational axis of the wheel-guiding control arm relative to the longitudinal direction of the vehicle. Due to the oblique position it is advantageously possible to be able to use the wheel-guiding control arm, despite a small fitting width in the transverse direction of the vehicle, for a comparatively high spring ratio.

In general the vehicle axle can be designed in various ways. In a preferred further development, relative to a vertical direction of the vehicle the wheel-guiding control arm is arranged in a lower control-arm plane and the wheel carrier with the camber link that joins it to the body in a plane above that plane.

A favorable structural space configuration is obtained if the integral link is arranged essentially inside the wheel.

Preferably, the integral link is at a first connection articulated to the wheel-guiding control arm and at a second connection articulated to the wheel carrier.

From the elastic-kinematic standpoint in particular, it is advantageous for the integral link in the unsteered condition of the wheel to be orientated essentially in the vertical direction of the vehicle.

Advantageously, the vehicle axle is suitable for the wheel to be driven by the drive unit by way of a shaft that extends essentially in the transverse direction of the vehicle. In that case the shaft preferably extends between the spring and the chassis element, relative to the longitudinal direction of the vehicle.

BRIEF DESCRIPTION OF THE DRAWINGS

Below, the invention is described with reference to the drawing, which shows:

FIG. 6: A (left) portion of a vehicle axle according to the invention, viewed from above.

DETAILED DESCRIPTION OF THE PREFERRED EMBODIMENTS

Figure 1:
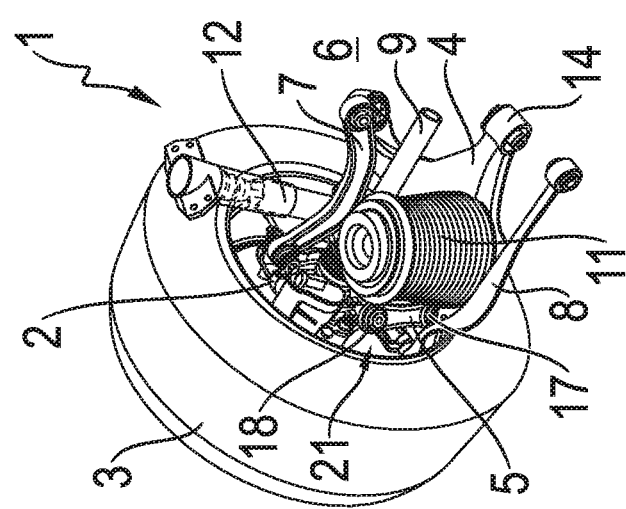
FIG. 1: A wheel suspension (on the left) of a vehicle axle according to the invention, viewed in perspective obliquely from behind.

FIGS. 1 to 5 in the attached drawings relate to a wheel suspension 1 of a vehicle axle according to an example embodiment of the invention. Since all of the FIGS. 1 to 5 relate to the same example embodiment, in the various representations the same components are given the same indexes. Thus, explanations already given about individual components or about the interactions and function of the wheel suspension are applicable to all the FIGS. 1 to 5. To avoid repetition, therefore, reference is made to the description of the example embodiment as a whole.

For orientation purposes each of FIGS. 1 to 6 has a coordinate system which, in the representation concerned, indicates at least two of the following directions: longitudinal direction of the vehicle x, transverse direction of the vehicle y, and vertical direction of the vehicle z. The longitudinal direction x of the vehicle corresponds to the forward-driving direction of the vehicle.

FIGS. 1 to 5 show a wheel suspension 1 of a vehicle axle (not shown in full therein) according to an example embodiment of the invention, viewed from various perspectives. Specifically, this is the wheel suspension of a rear wheel of a passenger motor vehicle. The wheel suspension is part of the vehicle axle.

For this, a wheel 3 is held by a wheel carrier 2 and is mounted to rotate relative thereto about a wheel axis (not indicated further). The wheel suspension 1 further comprises a wheel-guiding control arm 4 for the articulated connection of the wheel carrier 2 to a vehicle body 6. The body 6 (not shown, for representational reasons) can be the body of the vehicle or a so-termed axle carrier, which can be mounted fixed onto the body of a vehicle. The term "body" in the context of this patent application is accordingly to be interpreted broadly, and is understood to refer both to the body of the vehicle and to assemblies permanently attached to it, such as an axle carrier that can be mounted on the vehicle body or connecting components comparable thereto.

Figure 4:
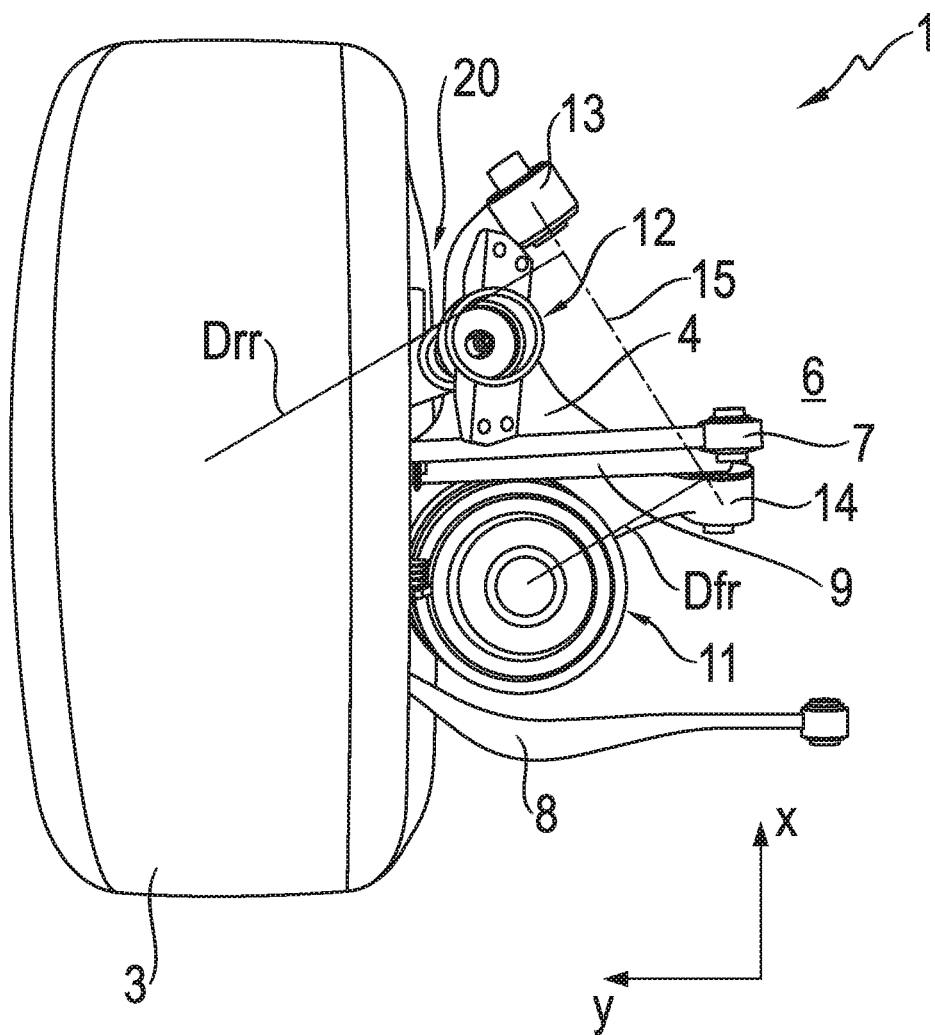
FIG. 4: The wheel suspension, viewed as in FIG. 2 with aid lines to help clarify the spring ratio.

The wheel-guiding control arm 4 is an approximately trapezium-shaped, integral component which has a forward mounting 13 on the body side and a rear mounting 14 on the body side, such that by virtue of the mountings 13 and 14 the wheel-guiding control arm 4 is mounted and can pivot on the body 6 in such manner that the wheel-guiding control arm 4 can pivot relative to the body 6 about a rotational axis 15 (see FIG. 4). As can be seen from the representation in FIG. 4 (view from above), the rotational axis 15 is obliquely inclined relative to the longitudinal axis x of the vehicle, by between 10° and 45°. Due to this obliquity relative to the longitudinal axis x of the vehicle, the wheel-guiding control arm can also be called an "oblique control arm"—as opposed to a transverse control arm.

Figure 2:
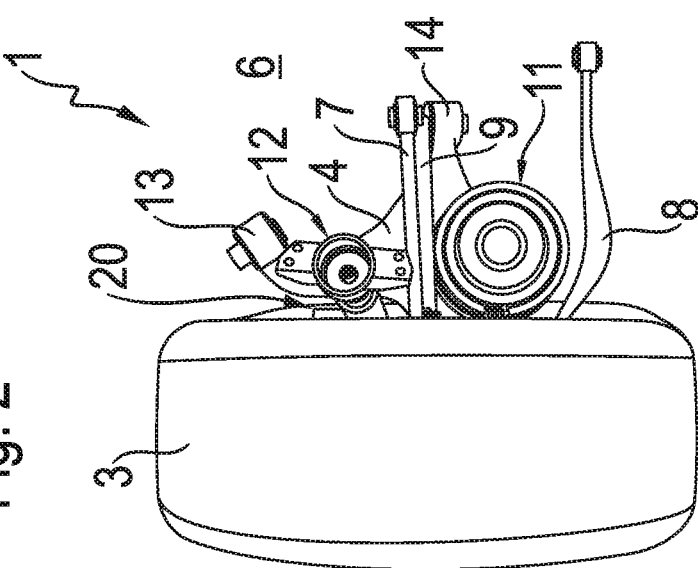
FIG. 2: The wheel suspension of FIG. 1, viewed from above.
Figure 3:
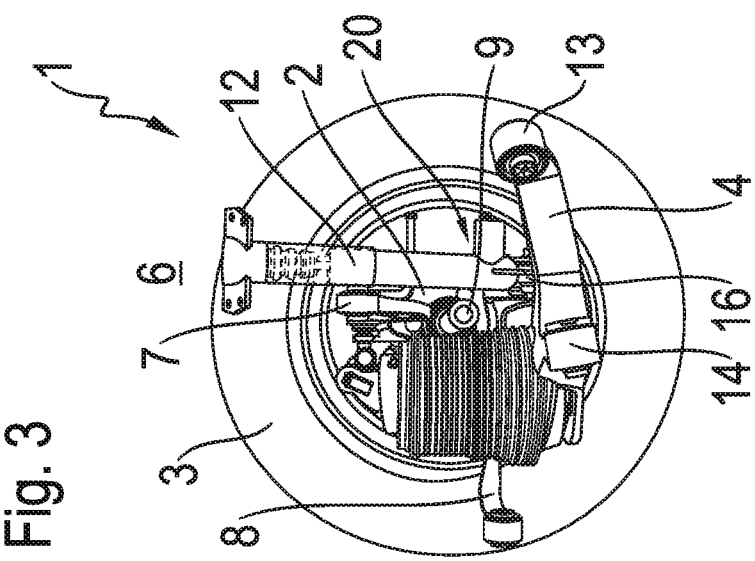
FIG. 3: The wheel suspension of FIGS. 1 and 2, viewed from the middle of the vehicle.

The wheel-guiding control arm 4 is connected to the wheel carrier 2 in a particular manner. In a first connection area 20 the wheel carrier is connected directly to the wheel-guiding control arm 4 by means of a ball joint. This first connection area 20, indicated by arrows in FIGS. 2, 3 and 4, is in relation to the longitudinal axis x of the vehicle ahead of the middle of the wheel 3. Alternatively the connection area 20 could be positioned behind but close to the middle of the wheel 3, particularly if the rim of the wheel 3 is large enough. In a second connection area 21 (see FIG. 1) the wheel carrier 2 is also connected indirectly to the wheel-guiding control arm 4 by means of an integral link 5. The integral link 5 is a two-point linkage articulated at its lower end by a first joint 17 to the wheel-guiding control arm 4. An upper end of the integral link 5 is articulated to the wheel carrier 2 by means of a second joint 18. The wheel carrier 2 carrying the wheel 3 is thus connected to the wheel-guiding control arm 4 in a particular way to be explained below, or coupled thereto.

To enable the wheel 3 to be steered, the wheel carrier 2 can pivot relative to the wheel-guiding control arm 4 about a steering axis, which axis extends through wheel carrier connections in a lower control-arm plane (first connection area 20) and in an upper control-arm plane (wheel carrier side end of the camber link 7). The connection between the wheel carrier 2 and the wheel-guiding control arm 4 via the first connection area 20 and the second connection area 21 is in this case in a lower control-arm plane. To determine the camber angle of the wheel 3, the wheel suspension 1 also comprises a camber link 7 which is arranged in a control-arm plane higher up. The camber link 7, most easily seen in FIG. 1, is an approximately c-shaped component extending essentially in the transverse direction y of the vehicle. On the body side the camber link 7 is articulated to the body 6 and on its wheel carrier side the camber link 7 is connected to a forward-projecting arm of the wheel carrier 2. In this way the wheel carrier 2 is connected to the body 6 in the lower control-arm plane by means of the wheel-guiding control arm 4 and in the upper control-arm plane by means of the camber link 7. The wheel carrier 2 can thereby pivot about a pivot axis which extends through the fist connection area 20 and a joint connecting the camber link 7 to the wheel carrier 2. Depending on the jouncing condition of the wheel-guiding control arm 4 the steering axis so formed (passing through the points described) can vary its position relative to the body 6 of the vehicle.

To support torques that act upon the wheel carrier 2 about the rotational axis of the wheel 3, the wheel carrier 2—besides its connection in the first connection area 20—is coupled indirectly to the wheel-guiding control arm 4 in the second connection area 21. This indirect coupling takes place by way of the already described integral link 5, and in the unsteered condition of the wheel 3 the integral link 5 is directed essentially in the vertical direction z of the vehicle, as can be seen in FIG. 1. By means of the upper connection 18 the integral link 5 is articulated to an inward-projecting arm of the wheel carrier 2, while by means of the lower connection 17 it is articulated to the wheel-guiding control arm 4 in its rear area.

To steer the wheel 3, as can be seen for example in FIGS. 1 and 2 the wheel carrier 2 is articulated to an end of a track control arm 8 on the wheel carrier side. The track control arm 8 is an elongated component and extends essentially in the transverse direction y of the vehicle. To bring about an active steering of the wheel 3, the track control arm 8 can be connected to a steering adjuster (actuator 23, only shown in FIG. 6) arranged on the body 6. To perform active steering movements, the track control arm 8 is then moved by the steering adjuster in the transverse direction y of the vehicle, this transverse movement being transferred by the track control arm 8 to the rear area of the wheel carrier 2. As a result of this transverse movement the wheel carrier 2 pivots about its previously described steering axis.

It should be mentioned that the wheel suspension 1 can alternatively be equipped with passive steering. In that case the steering means provided is in each case in the form of a track control arm. On the wheel carrier side such a track control arm is also connected to an inward-projecting arm of the wheel carrier (as in the case of active steering of the track control arm 8). Like a track rod, the track control arm too is in the form of an elongated component extending essentially in the transverse direction of the vehicle with an articulated connection on the body side to the vehicle. A steering adjuster (actuator) is not needed in this case, since in the case of passive steering influence is exerted exclusively by means of the wheel stroke.

The wheel suspension 1 is provided with a spring-damper system. In the example embodiment according to the invention shown in FIGS. 1 to 4, the spring-damper system of the wheel suspension 1 has a separated configuration, i.e. with a spring 11 and a damper 12 arranged separately from one another. The damper 12 is an elongated component directed essentially in the vertical direction z of the vehicle. An upper end of the damper 12 is connected to the body 6 of the vehicle, whereas a lower end of the damper 12 is connected directly to the wheel carrier 2 by way of a damper mounting 16 (see FIG. 3). Thus, the damper 12 is arranged so that it follows all the height movements of the wheel carrier 2 caused by spring compression or extension by jouncing up and down, and dampens them. Due to the direct connection with the wheel carrier 2, the stroke movements of the wheel carrier 2 are transmitted directly to the damper 12, that is to say, without the interposition of other chassis components. As can be seen in FIGS. 2 and 3, relative to the longitudinal direction of the vehicle, the damper 12 is positioned ahead of the middle of the wheel 3 and at the same time ahead of a driveshaft 9 that drives the wheel 3.

Figure 5:
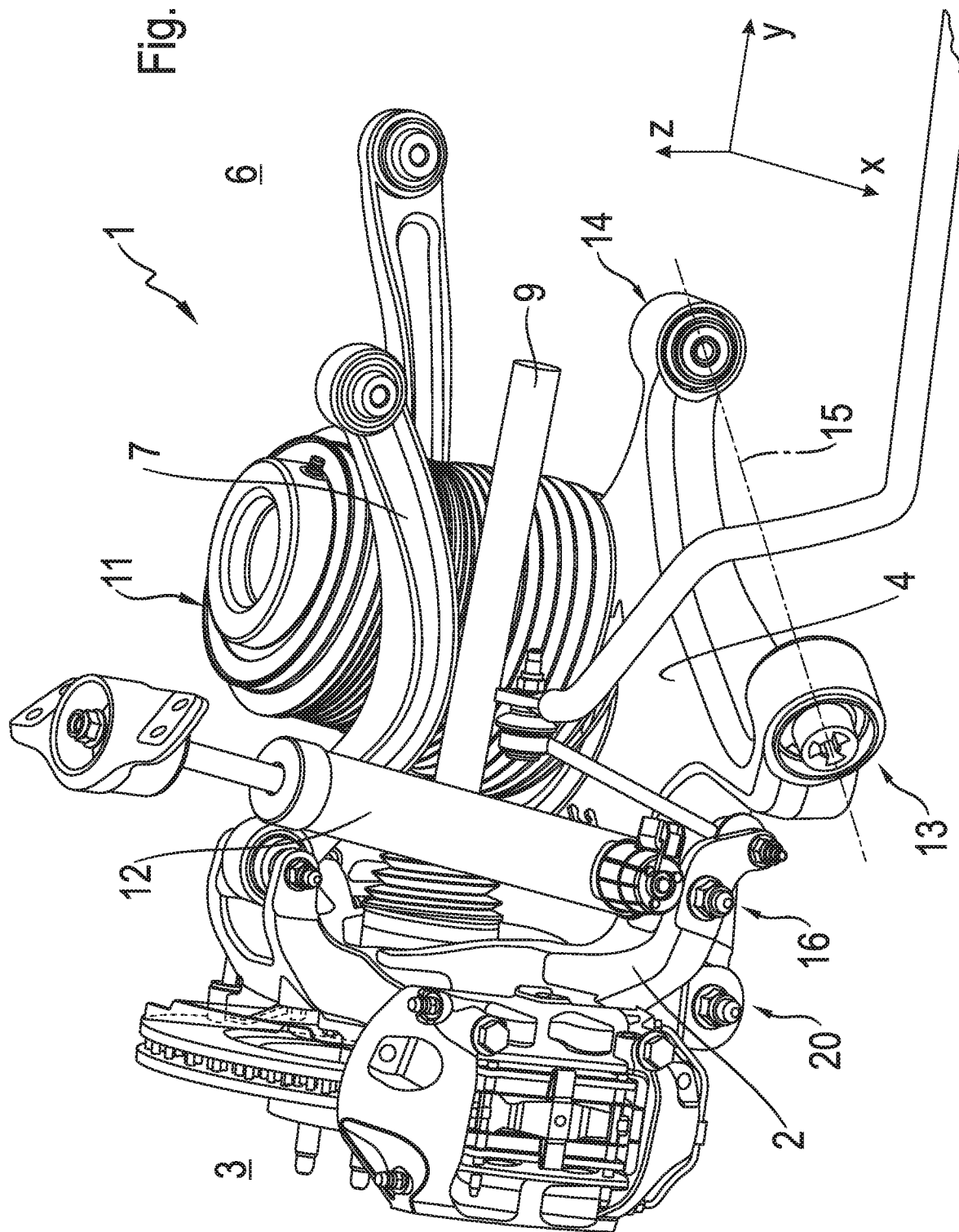
FIG. 5: A wheel suspension (on the right) of a vehicle axle according to the invention, viewed in perspective from the front.

As can best be seen in FIG. 5, which shows a wheel suspension structurally the same as that shown in FIGS. 1 to 4 viewed from the front (in this case on the right-hand side of the vehicle as viewed from the longitudinal direction x of the vehicle), the connection of the damper 12 to the wheel carrier 2 on the wheel-carrier side is close to the first connection area 20 in which the wheel carrier 2 is articulated to the wheel-guiding control arm 4 by means of a ball joint or a rubber mounting.

The wheel suspension 1 also comprises the spring 11 which, in the example embodiment illustrated, is in the form of an air spring. Otherwise than the damper 12, in relation to the longitudinal direction x of the vehicle the spring 11 is positioned behind the middle of the wheel 3 and at the same time behind the driveshaft 9 that drives the wheel 3, as can be seen for example in FIGS. 2 and 3. A lower end of the spring 11 rests against the wheel-guiding control arm 4. An upper end of the spring 11—relative to the vertical direction z of the vehicle—is supported against the body 6 of the vehicle. Thus, the spring 11 is arranged between the wheel-guiding control arm 4 and the body 6 and acts between them. When the wheel 3 is deflected, the lower end of the spring 11 is raised by the wheel-guiding control arm 4, which is connected to the wheel carrier 2, toward the body 6 (in the vertical direction z of the vehicle). This compresses the spring 11 and with increasing compression generates a restoring force that counteracts the deflection.

Since the damper 12 is positioned ahead of the middle of the wheel or ahead of the driveshaft 9, the spring 11 leaves available a comparatively larger structural space which, relative to the representation in FIG. 2, is delimited in the longitudinal direction x of the vehicle to the front by the driveshaft 9 or the camber link 7 and to the rear by the track control arm 8. The spring 11 can also be positioned far to the outside close to the wheel 3, so that a good spring ratio is achieved. The comparatively large structural space for the spring 11, moreover, enables the spring 11 to be made as an adjustable air spring as regards its spring characteristic. Alternatively it could be an adjustable hydraulic spring. It should be mentioned that the advantages of the invention can basically also be achieved with a spring that is not adjustable. However, an adjustable spring gives advantages in relation to comfort and adaptability to differing operating situations. For example, with an air spring a change of the air pressure in the spring bellows enables the height of the vehicle to be adjusted. Quite generally, the structural space provided enables the spring—regardless of its type—to have a comparatively large diameter, which is advantageous even in the case of a spiral spring.

It has already been mentioned that the wheel-guiding control arm 4 has a rotational axis 15 which extends obliquely relative to the longitudinal direction x of the vehicle, as can be seen particularly clearly in FIG. 4. Due to the obliquity and the arrangement of the spring 11 and damper 12 chosen in the example embodiment shown, the wheel suspension 1 has favorable efficiency in relation to the spring 11. To explain this, in FIG. 4 three aid lines are shown. Here, first there is the rotational axis 15 that extends between the forward mounting 13 and the rear mounting 14 of the wheel-guiding control arm 4. Further aid lines picture the distance Dfr of the spring 11 from the rotational axis 15 and a distance Drr of the wheel 3 from the rotational axis 15. From a length comparison of the two distances (spring 11 and wheel 3, in each case from the rotational axis 15), the spring ratio of the spring 11 is obtained. In the example embodiment shown, this spring ratio has a value of around 0.7. In light of the relatively compact structure of the wheel suspension 1 particularly in relation to the comparatively short extension of the wheel-guiding control arm 4 in the transverse direction y of the vehicle, this is a relatively high value.

In the example embodiment shown, owing to the direct connection existing between the damper 12 and the wheel carrier 2, a favorable efficiency is also achieved for the damper 12 in a comparable manner. By virtue of the forward-side and rear-side arrangement of the damper 12 and the spring 11 (ahead of and behind the driveshaft), the wheel suspension 1 uses structural space in a favorable way.

FIG. 6 shows a portion of a vehicle axle 24 according to an example embodiment of the invention, viewed from above. The vehicle axle 24 comprises as an essential constituent a central drive unit 22a, 22b and two wheel suspensions 1, of which for representational reasons only the wheel suspension 1 on the left in relation to the longitudinal direction x of the vehicle is shown. The (left) wheel suspension 1 shown corresponds to the wheel suspension 1 described with reference to FIGS. 1 to 5, both structurally and with regard to its indexing, and for that reason repeated explanations concerning it are avoided, whereas reference should be made to the remarks made there.

As already mentioned, the vehicle axle 24 has a centrally located drive unit 22a, 22b. In the example embodiment shown, the drive unit comprises two electric drive motors so that the drive unit is divided into a left-hand part 22a and a right-hand part 22b relative to the longitudinal direction x of the vehicle in each case. The left-hand part 22a is positioned to the left of the middle of the vehicle and can be brought into driving connection via the driveshaft 9 with the wheel 3 of the left-hand wheel suspension 1 (which is shown). The right-hand part 22b is positioned to the right of the middle of the vehicle and can also be brought into driving connection via a driveshaft (not shown) with a wheel of a right-hand wheel suspension (not shown). The components on the right-hand side of the vehicle correspond structurally and functionally to those on the left-hand side of the vehicle (which are shown), but are by comparison configured and arranged in mirror-image relationship.

Since the wheel on each side of the vehicle can be driven by a drive unit of its own, namely 22a (left) and 22b (right), the drive torque transmitted to each wheel can be influenced individually (so-termed "torque-vectoring"), so that improved driving properties can be achieved in different driving situations.

The representation in FIG. 6 shows that the drive unit 22a, 22b occupies a considerable structural width in the transverse direction y of the vehicle. The vehicle axle 24 is designed such that despite the structural width, it has a respective wheel suspension 1 at each side, which enables a wheel to be driven, to be steered and to meet strict driving-dynamical demands. This is made possible in particular because all the connection areas 13, 14 of the lower wheel-guiding control arm 4 are positioned outside the centrally arranged drive unit 22 in relation to the transverse direction y of the vehicle. So that at the same time the vehicle axle will offer high suspension comfort, the lower wheel-guiding control arm 4 can be connected to the body 6 in a forward (outer) area 13 and in a rear (by contrast, inner) area 14, and relative to the longitudinal axis x of the vehicle has a rotational axis that extends obliquely. Thanks to the obliquely extending rotational axis, the advantages already explained in the description, relating to the ratio conditions for the spring 11 and the damper 12, are obtained.

In FIG. 6 it can also be seen that the vehicle axle 24 is equipped with active steering. For this, the end of the track control arm 8 remote from the wheel 3 in the left-hand wheel suspension 1 is connected to a steering adjuster 23, which is arranged centrally on the body side behind the drive unit 22a, 22b. The steering adjuster 23 comprises an electric actuator and is designed such that it can move the end of the track control arm 8 connected to it in translation (in the transverse direction y of the vehicle) in order in that way to bring about a steering movement of the wheel 3. The steering adjuster 23 is a so-termed central adjuster, i.e. a track control arm of the right-hand wheel suspension (not shown in full in FIG. 6) is connected to the steering adjuster 23 in the same way. An actuation of the steering adjuster 23 therefore brings about a steering movement of the left-hand wheel suspension 1 and the right-hand wheel suspension at the same time.

INDEXES

1 Wheel suspension
2 Wheel carrier
3 Wheel
4 Wheel-guiding control arm
5 Integral link
6 Body
7 Camber link
8 Track control arm
9 Driveshaft
11 Air spring
12 Damper
13 Forward mounting
14 Rear mounting
15 Rotational axis
16 Damper mounting
17 First integral link connection
18 Second integral link connection
20 First connection area
21 Second connection area
22a Electric drive unit (left-hand part)
22b Electric drive unit (right-hand part)
23 Steering adjuster
24 Vehicle axle
Dfr Distance from spring to rotational axis
Drr Distance from wheel to rotational axis
x Longitudinal direction of the vehicle
y Transverse direction of the vehicle
z Vertical direction of the vehicle

The invention claimed is:

1. A vehicle axle comprising:
a centrally arranged drive,
a wheel suspension,
the wheel suspension comprising a wheel carrier for holding a wheel of a vehicle,
a lower wheel-guiding control arm for articulated connection of the wheel carrier to a vehicle body,
a camber link for connecting the wheel carrier to the vehicle body,
a steering means for steering the wheel,
the wheel carrier and the wheel-guiding control arm being directly connected, in a first connection area, and indirectly connected, via an integral link, in a second connection area, such that the wheel carrier is pivotable relative to the wheel-guiding control arm about a steering axis, the wheel-guiding control arm being connectable to the vehicle body in a forward area and in a rear area, and has a rotational axis extending obliquely relative to the longitudinal direction of the vehicle, and all connection areas of the wheel-guiding control arm (4) being positioned outside the centrally arranged drive unit relative to a transverse direction of the vehicle.

2. The vehicle axle according to claim 1, wherein the drive unit comprises at least one electric drive motor, and a drive connection, for driving the wheel, is provided between the drive unit and the wheel.

3. The vehicle axle according to claim 1, wherein a chassis element, articulated on a body side, is directly connected to the wheel carrier.

4. The vehicle axle according to claim 3, wherein the chassis element is a damper.

5. The vehicle axle according to claim 3, wherein, relative to the longitudinal direction of the vehicle, the chassis element is positioned either ahead of a middle of the wheel or above a driveshaft that drives the wheel (3).

6. The vehicle axle according to claim 3, wherein, relative to the wheel carrier, the connection on the wheel carrier side of the chassis element is formed close to the first connection area.

7. The vehicle axle according to claim 1, wherein, relative to the longitudinal direction of the vehicle, the first connection area is located close to the middle of the wheel and the second connection area is located behind the middle of the wheel.

8. The vehicle axle according to claim 1, wherein the wheel-guiding control arm is supported against the vehicle body by a spring that extends substantially in a vertical direction of the vehicle.

9. The vehicle axle according to claim 8, wherein, relative to the longitudinal direction of the vehicle, the spring is positioned behind at least one of a middle of the wheel and a driveshaft that drives the wheel.

10. The vehicle axle according to claim 8, wherein the wheel suspension has a spring ratio of between 0.5 and 1.0, and the spring ratio is defined as a ratio between a distance of the spring from the rotational axis and a distance of the wheel from the rotational axis.

11. The vehicle axle according to claim 1, wherein, relative to a vertical direction of the vehicle, the wheel-guiding control arm is in a lower control arm plane, and the camber link, that connects the wheel carrier to the vehicle body (6), is in a higher control arm plane above the lower control arm plane.

12. The vehicle axle according to claim 1, wherein the integral link is arranged substantially inside the wheel.

13. The vehicle axle according to claim 1, wherein, in an un-steered condition of the wheel, the integral link is aligned substantially in a vertical direction of the vehicle.

14. The vehicle axle according to claim 1, wherein, at a first link connection, the integral link is articulated to the wheel-guiding control arm and, at a second link connection, the integral link is articulated to the wheel carrier.

15. The vehicle axle according to claim 1, wherein the wheel is drivable by the drive unit via a shaft that extends substantially in the transverse direction of the vehicle, and the shaft, relative to the longitudinal direction of the vehicle, extends between a spring and a chassis element.

16. A vehicle axle that extends in a transverse direction of a vehicle that is perpendicular to a central longitudinal axis of the vehicle, the vehicle axle comprising:

an electric drive unit being arranged in the transverse direction, adjacent the central longitudinal axis of the vehicle;

a wheel suspension having a wheel carrier on which a wheel of the vehicle being mounted, a lower wheel-guiding control arm via which the wheel carrier being articulatably connected to a vehicle body, a camber link via which the wheel carrier being connectable to the vehicle body, and steering means for steering the wheel;

the wheel carrier and the wheel-guiding control arm being directly connected, in a first connection area, and indirectly connected, via an integral link in a second connection area, so that the wheel carrier being pivotable relative to the wheel-guiding control arm about a steering axis;

the wheel-guiding control arm being connectable in a forward area and in a rear area to the vehicle body, and the wheel-guiding control arm having a rotational axis that extends obliquely relative to the longitudinal axis of the vehicle; and the first and the second connection areas and the forward and the rear areas of the wheel-guiding control arm being positioned in the transverse direction outside the electric drive unit.

\* \* \* \* \*